(12) United States Patent
Park et al.

(10) Patent No.: US 8,433,814 B2
(45) Date of Patent: Apr. 30, 2013

(54) DIGITAL CONTENT DISTRIBUTION SYSTEM AND METHOD

(75) Inventors: Anthony Neal Park, San Jose, CA (US); Neil D. Hunt, Los Altos, CA (US); Wei Wei, Fremont, CA (US)

(73) Assignee: NETFLIX, Inc., Los Gatos, CA (US)

( * ) Notice: Subject to any disclaimer, the term of this patent is extended or adjusted under 35 U.S.C. 154(b) by 553 days.

(21) Appl. No.: 12/504,528

(22) Filed: Jul. 16, 2009

(65) Prior Publication Data

US 2011/0016225 A1    Jan. 20, 2011

(51) Int. Cl.
*G06F 15/173* (2006.01)

(52) U.S. Cl.
USPC ............. 709/234; 709/227; 370/229; 725/95

(58) Field of Classification Search ............... None
See application file for complete search history.

(56) References Cited

U.S. PATENT DOCUMENTS

| | | | |
|---|---|---|---|
| 2003/0135863 A1* | 7/2003 | Van Der Schaar | 725/95 |
| 2003/0229900 A1 | 12/2003 | Reisman | |
| 2004/0024900 A1* | 2/2004 | Breiter et al. | 709/231 |
| 2004/0078812 A1* | 4/2004 | Calvert | 725/46 |
| 2004/0103207 A1 | 5/2004 | Elman et al. | |
| 2007/0226365 A1 | 9/2007 | Hildreth et al. | |
| 2008/0222243 A1* | 9/2008 | Shaw | 709/203 |
| 2008/0244038 A1 | 10/2008 | Martinez et al. | |

OTHER PUBLICATIONS

International Search Report, PCT Appl. No. PCT/US 10/42174, mailed Sep. 7, 2010.

* cited by examiner

*Primary Examiner* — Moustafa M Meky
*Assistant Examiner* — Clayton R Williams
(74) *Attorney, Agent, or Firm* — Patterson & Sheridan, LLP

(57) ABSTRACT

One embodiment of the present invention sets forth a technique for selecting a content distribution network (CDN) comprising at least one content server, from a plurality of CDNs, and a playing digital content file from the CDN on a content player. Selecting the CDN is based on a rank order of CDNs, an assigned weight value for each CDN, and a bandwidth measured between the content player and each CDN. Advantageously, a given content player may select a CDN based on prevailing network and CDN loading conditions, thereby increasing overall robustness and reliability when downloading digital content file from a CDN.

24 Claims, 6 Drawing Sheets

DIGITAL CONTENT DISTRIBUTION SYSTEM AND METHOD

BACKGROUND OF THE INVENTION

1. Field of the Invention

Embodiments of the present invention relate generally to digital media and, more specifically, to a digital content distribution system and method.

2. Description of the Related Art

Digital content distribution systems conventionally include a content server, a content player, and a communications network connecting the content server to the content player. The content player may be configured to play digital content files, such as digitally encoded songs, movies, or television programs, to name a few. A given digital content file may be downloaded from the content server to the content player via the communications network. The content player may download and store at least a portion of the digital content file to facilitate uninterrupted playback of the title. Content may be played back via an audio system, a video system, or a combination thereof. The content server comprises a computer system configured to store a specific set of titles and facilitate download of the digital content files to one or more content players.

In practical scenarios, one or more content servers may be configured together within a communications network to form a content distribution network. Each content distribution network may include one or more content servers and one or more network communication systems configured to interconnect the content servers and content players. Each content distribution network may host a plurality of digital content files. A content directory server comprises a computer system configured to provide a listing of title names of digital content files, and to associate a content distribution network with each title via a reference mechanism, such as a universal resource locator (URL). When a content player needs to play a specific title, the content player first posts a request to the content directory server for a reference to a content distribution network configured to host the title. The content player then downloads and plays the title from the content distribution network specified in the reference provided by content directory server.

The content player may be located in one region of the communications network, whereas the content distribution network may be disposed in a different region of the communications network. Networking systems such as routers and switches are conventionally configured to interconnect the content player with the content distribution network. In certain high traffic scenarios, congestion within the communications network may constrain bandwidth between certain end points, such as between the content player and the content distribution network. Furthermore, networking systems between the content player and the content distribution network may fail without notice, creating reliability problems. Compounding reliability problems, content servers and networking systems within the content distribution network may also fail or become overloaded without notice. As a result, the content player may be unable to reliably download and play digital content files requested by a user.

As the foregoing illustrates, what is needed in the art is an approach for downloading digital content files to a content player that is more robust and reliable than prior art approaches.

SUMMARY OF THE INVENTION

One embodiment of the present invention sets forth a method for downloading a digital content file from a content distribution network (CDN) residing within a content distribution system. The method includes the steps of receiving a CDN list from a content directory server that includes one or more CDNs residing within the content distribution system and also includes a rank and a weight for each of the one or more CDNs, and selecting a CDN from the CDN list from which to download the digital content file based on a bandwidth test, where the selected CDN is capable of downloading a portion of the digital content file to a content player machine at a highest bit rate associated with the content player machine or has a weighted bandwidth greater than or equal to the weighted bandwidth associated with any other CDN included in the CDN list. The method also includes the steps of launching a buffering thread configured to download digital content associated with the digital content file from the selected CDN and to store the digital content in a content buffer, and launching a playback thread configured to play the digital content stored in the content buffer.

One advantage of the disclosed method is that each content player within the content distribution system is able to facilitate reliable content playback, despite certain failures within the communications network and certain other CDN failures. The content player is able to re-establish playback under severe fault conditions and beneficially select a good CDN for downloading a digital content file in suboptimal system wide conditions.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
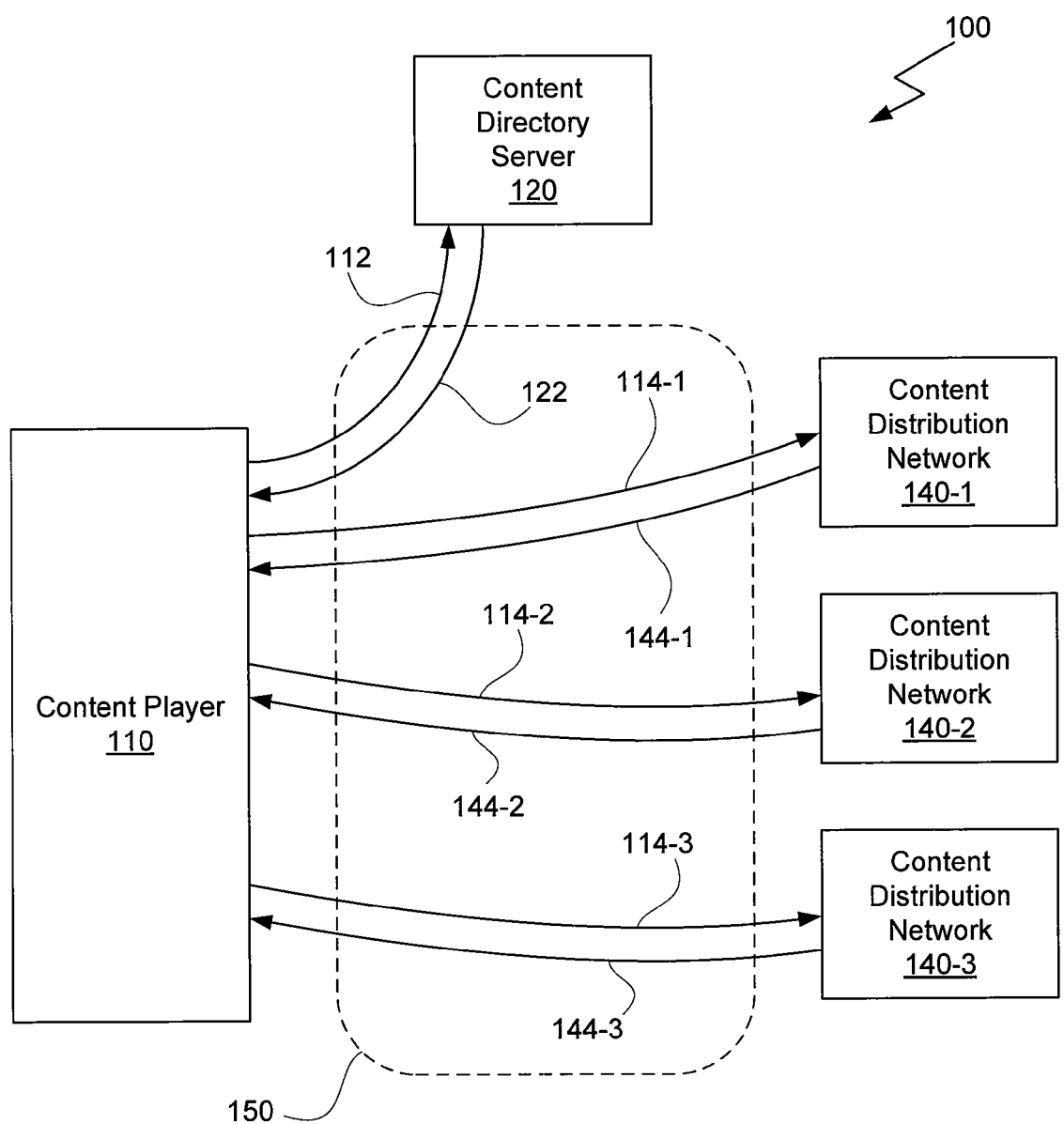
FIG. 1 illustrates a content distribution system configured to implement one or more aspects of the present invention.

FIG. 1 illustrates a content distribution system 100 configured to implement one or more aspects of the present invention. As shown, the content distribution system 100 includes, without limitation, a content player 110 configured to select a digital content file for playback from one of a plurality of content distribution networks 140. A content directory server 120 is configured to provide the content player 110 with a list of content distribution networks hosting the digital content file. A communications network 150, such as the well-known internet communications network, provides communications infrastructure for enabling communication between the content player 110, content directory server 120, and the content distribution networks 140.

The content player 110 may comprise a computer system, a set top box, a mobile device such as a mobile phone, or any other technically feasible computing platform that has network connectivity and is coupled to or includes a display device. Each content distribution network (CDN) 140 comprises at least one computer system configured to service download requests for digital content files from the content player 110. The digital content file can comprise any type of encoded or non-encoded digital content (data), including, without limitation, movie content, television program content, or audio content. The digital content files may reside on a mass storage system accessible to the computer system, including, without limitation, direct attached storage, network attached file storage, or network attached block-level storage. The digital content files may be formatted and stored on the mass storage system using any technically feasible technique. Any data transfer protocol, such as a conventional file transfer protocol (FTP) or conventional hypertext transfer protocol (HTTP), may be used to download digital content files from the CDN 140 to the content player 110.

In a practical setting, a plurality of content players 110 connect to a plurality of CDNs 140. A content directory server 120 may be used to direct a given content player 110 to a specific CDN 140 from which to download a specific digital content file. The content directory server 120 should reside at a network address that is known to the plurality of content players 110. The network address may comprise a specific internet protocol (IP) address or a specific universal resource locator (URL), or any other technically feasible network address.

The communications network 150 may include a plurality of network communications systems, such as routers and switches, configured to facilitate data communication between the content player 110 and the plurality of content distribution networks 140. Persons skilled in the art will recognize that many technically feasible techniques exist for building the communications system 150, including technologies practiced in deploying the well-known internet communications network.

In one operating scenario, the content player 110 may transmit a title lookup request 112 to the content directory server 120. The title lookup request 112 may include a specific title name of a particular digital content file, such as "Gone with the Wind." In response to the title lookup request 112, the content directory server 120 generates and transmits a CDN list 122 to the content player 110. The CDN list 122 specifies one or more CDNs 140 that each host a copy of the digital content file named in the title lookup request 112. For a given title, each CDN list 122 may be different for each content player 110, and a given content player 110 may receive a different CDN list 122 for each different requested title.

In one embodiment, the CDN list 122 also states a rank and weight for each CDN 140. Rank may be implied according to the order of the CDN list 122 or stated explicitly as a number associated with a given CDN 140. Weight is stated explicitly as a number associated with the given CDN 140. In one embodiment, each CDN 140 within the CDN list 122 includes a list of URLs of individual content servers within the CDN 140. Table 1 illustrates an exemplary CDN list 122.

TABLE 1

| CDN 1: | Rank = 1 |
|        | Weight = 140 |
|        | Streams = URL1, URL2 |
| CDN 2: | Rank = 2 |
|        | Weight = 120 |
|        | Streams = URL3, URL4, URL5 |
| CDN 3: | Rank = 3 |
|        | Weight = 100 |
|        | Streams = URL6, URL7, URL8 |

As shown, three CDNs are listed, "CDN1" through "CDN3," corresponding to CDN 140-1 through CDN 140-3 of FIG. 1. Each CDN 140 includes a rank field, a weight field and a streams field, which is used to specify one or more content servers configured to download digital content files to the playback device 110. Each URL1 through URL8 may be of the form "http://network-address-name," where the URL specifies a hypertext transfer protocol (HTTP) as the data transfer protocol.

The order of the rankings associated with the different CDNs 140 within the various CDN lists 122 is used to manage the traffic between the content players 110 and the CDNs 140 within the content distribution system 100. The order of the rankings associated with the different CDNs 140 for a given content player 110 may be selected using any technically feasible technique based on factors such as, without limitation, customer identification number, title identification number, internet service provider identification number, geographic location of the content player 110, customer history, or prevailing server load, or any combination thereof.

For example, a modulo one hundred operation may be performed on the customer identification (a unique number assigned to a customer) for a given content player to generate a customer modulo value that ranges from zero to ninety-nine. A content player 110 with an associated modulo value from zero to sixty-nine may receive a CDN list 122 ranking CDN 1 first, while a content player 110 with an associated modulo value from seventy to ninety-nine may receive a CDN list 122 ranking CDN 2 first. In such a scenario, CDN 1 should average seventy percent of overall download bandwidth because approximately seventy percent of customer identification numbers fall between zero and sixty-nine, while CDN 2 should average thirty percent of overall download bandwidth because approximately thirty prevent of customer identification numbers fall between seventy and ninety-nine.

A weight value is also associated with each CDN 140 included in the CDN list 122. As described in greater detail herein, in the event that none of the CDNs 140 included in the CDN list 122 is capable of transmitting a "highest bit rate" download stream to the content player 110, the weight value serves as a preference or affinity for the content player 110 to select one of the CDNs 140 included in the CDN list 122 from which to download a particular digital content file. As used herein, the "highest bit rate" corresponds to the maximum average bit rate supported by the content player 110. In addition to the highest bit rate, the content player 110 typically supports at least one lower average bit rate.

Upon receiving the CDN list 122, the content player 110 selects one CDN 140 from which to download the digital content file named in the title lookup request 112. The content player 110 then proceeds to download and play the digital content file named in the title lookup request 112. In one embodiment, the content player 110 establishes a request stream 114 to request specific portions of the digital content file associated with the title lookup request 112 as well as a data transfer stream 144 configured to download the specific portions of the digital content file to the content player 110.

Although, in the above description, the content distribution system 100 is shown with one content player 110 and three CDNs 140, persons skilled in the art will recognize that the architecture of FIG. 1 contemplates only an exemplary embodiment of the invention. Other embodiments, may include any number of content players 110 and/or CDNs 140. Thus, FIG. 1 is in no way intended to limit the scope of the present invention in any way.

Figure 2:
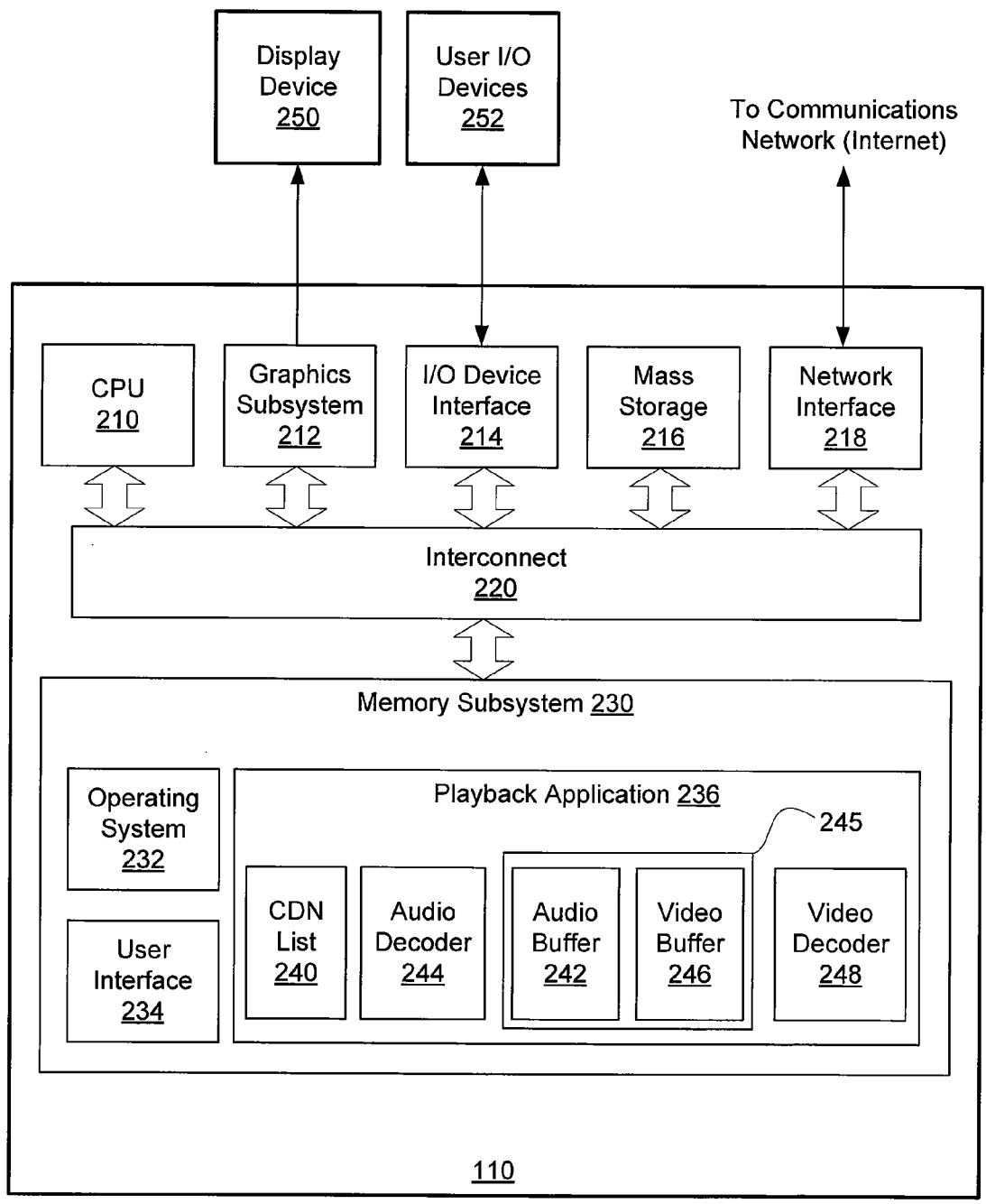
FIG. 2 is a more detailed view of the content player of FIG. 1, according to one embodiment of the invention.

FIG. 2 is a more detailed view of the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216.

The central processing unit (CPU) 210 is configured to retrieve and execute programming instructions stored in a memory subsystem 230. The CPU 210 retrieves the programming instructions from the memory subsystem 230 via an interconnect 220. The CPU 210 is configured to store and retrieve data in the memory subsystem 230 via the interconnect 220.

The graphics subsystem 212 is configured to generate frames of video data, such as a sequence of graphics images, and transmit the frames of video data to display device 250. The graphics subsystem 212 is coupled to the CPU 210 via the interconnect 220. In one embodiment, the graphics subsystem 212 is integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic) to produce a visual representation of the frames of video data. An input/output (I/O) device interface 214 is configured to receive input data from user I/O devices 252 and transmit the input data to the CPU 210 via the interconnect 220. For example, user I/O devices 252 may comprise one or more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. The mass storage unit 216 is coupled to the CPU 210 via the interconnect 220. A network interface 218 is configured to transmit and receive packets of data via the communications network 150. In one embodiment, the network interface 218 is configured to communication using the well-known Ethernet standard. The network interface 218 is coupled to the CPU 210 via the interconnect 220.

The memory subsystem 230 includes programming instructions and data that comprise an operating system 232. The operating system 232 performs system management functions such as managing hardware devices including the network interface 218, mass storage unit 216, I/O device interface 214, and graphics subsystem 212. The operating system 232 also provides process and memory management models for a user interface 234 and a playback application 236. The user interface 234 provides a specific structure, such as a window and object metaphor, for user interaction with content player 110. Persons skilled in the art will recognize the various operating systems and user interfaces that are well-known in the art and suitable for incorporation into the content player 110.

The playback application 236 is configured to retrieve a digital content file from a CDN 140 via the network interface 218 and play the digital content file via the graphics subsystem 212 and display device 250. The playback application 236 requests a CDN list 240, such as CDN list 122 of FIG. 1, from the content directory server 120. The playback application 236 selects a CDN from the CDN list 240, as described in greater detail below in FIG. 3B. The playback application 236 then proceeds to download and buffer the digital content file from a selected CDN 140. The playback application 236 generates a viewable rendering of the digital content file to a user during a playback process, as described in greater detail below in FIGS. 3A, 3C, and 3D.

An audio buffer 242 may be used to store audio data from a piece of digital content downloaded from the selected CDN 140. In one embodiment, an audio decoder 244 is used to decode data stored in the audio buffer 242 into one or more audio tracks. A video buffer 246 is used to store video data from a piece of digital content downloaded from the selected CDN 140. A video decoder 248 is used to decode and render data stored in the video buffer 242 into one or more sequences of viewable video frames. In one embodiment, a content buffer 245 comprises a unified buffer structure, including the audio buffer 242 and video buffer 246. In this embodiment, audio data and video data are structured into a single stream. In an alternative embodiment, the content buffer 245 comprises the audio buffer 242 and video buffer 246 configured as separate buffers that may be accessed independently for adding or removing data.

Figure 3A:
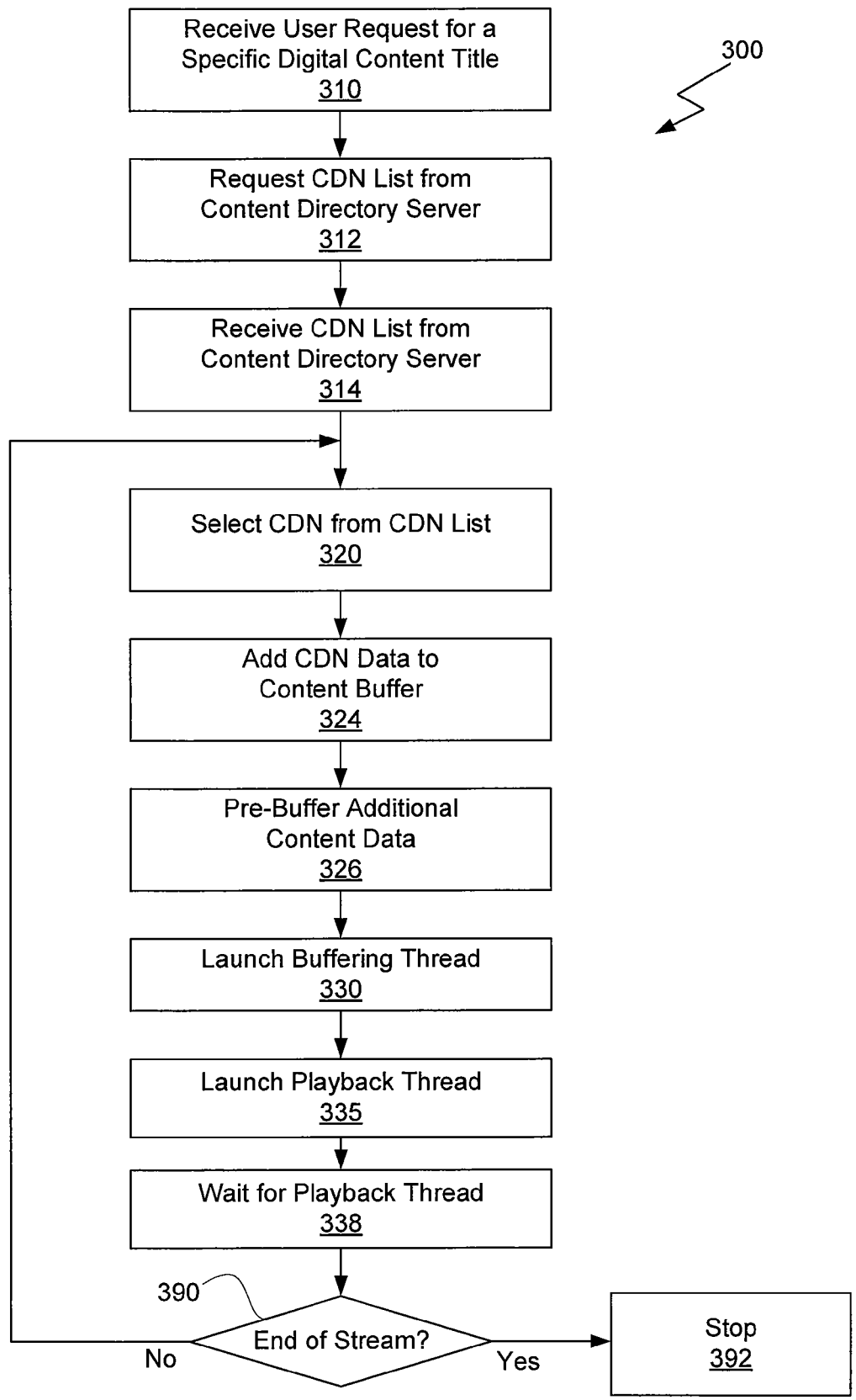
FIG. 3A is a flow diagram of method steps for downloading a digital content file from a content distribution network within a content distribution system, according to one embodiment of the invention.

FIG. 3A is a flow diagram of method steps 300 for downloading a digital content file from a content distribution network 140 within the content distribution system 100, according to one embodiment of the invention. Although the method steps are described in conjunction with the systems of FIGS. 1 and 2, persons skilled in the art will understand that any system configured to perform the method steps, in any order, is within the scope of the invention. In one embodiment, the method steps 300 execute as a content player management thread within the playback application 236.

The method begins in step 310, the playback application 236 receives a user request to play a selected digital content title. For example, the user may enter a selection using one or more of the user I/O devices 252 of FIG. 2, such as a keyboard or mouse. In step 312, the playback application 236 requests a CDN list 122 for the selected digital content file from the content directory server 120 via a title lookup request 112. In one embodiment, the content directory server 120 resides in a communications network at a location, such as a URL, known to the content player 110. In step 314, the playback application 236 receives a CDN list 122 from the content directory server 120, and the CDN list 122 is stored as CDN list 240 within the memory subsystem 230. Again, Table 1 previously described herein sets forth an exemplary structure for the CDN list 240.

In step 320, the playback application 236 selects one CDN 140 within the content distribution system 100 from the CDN list 240 from which the selected digital content file is to be downloaded. The algorithm for selecting the one CDN 140 is described in greater detail below in conjunction with FIG. 3B. One result of step 320 is that, in step 324, a portion of the digital content associated with the selected digital content file is stored in the content buffer 245. Consequently, the digital content associated with the selected digital content file can be accessed for playback more quickly, thereby reducing lag associated with the playback process. In step 326, the playback application 236 pre-buffers an additional amount of digital content associated with the selected digital content file prior to beginning playback.

Figure 3B:
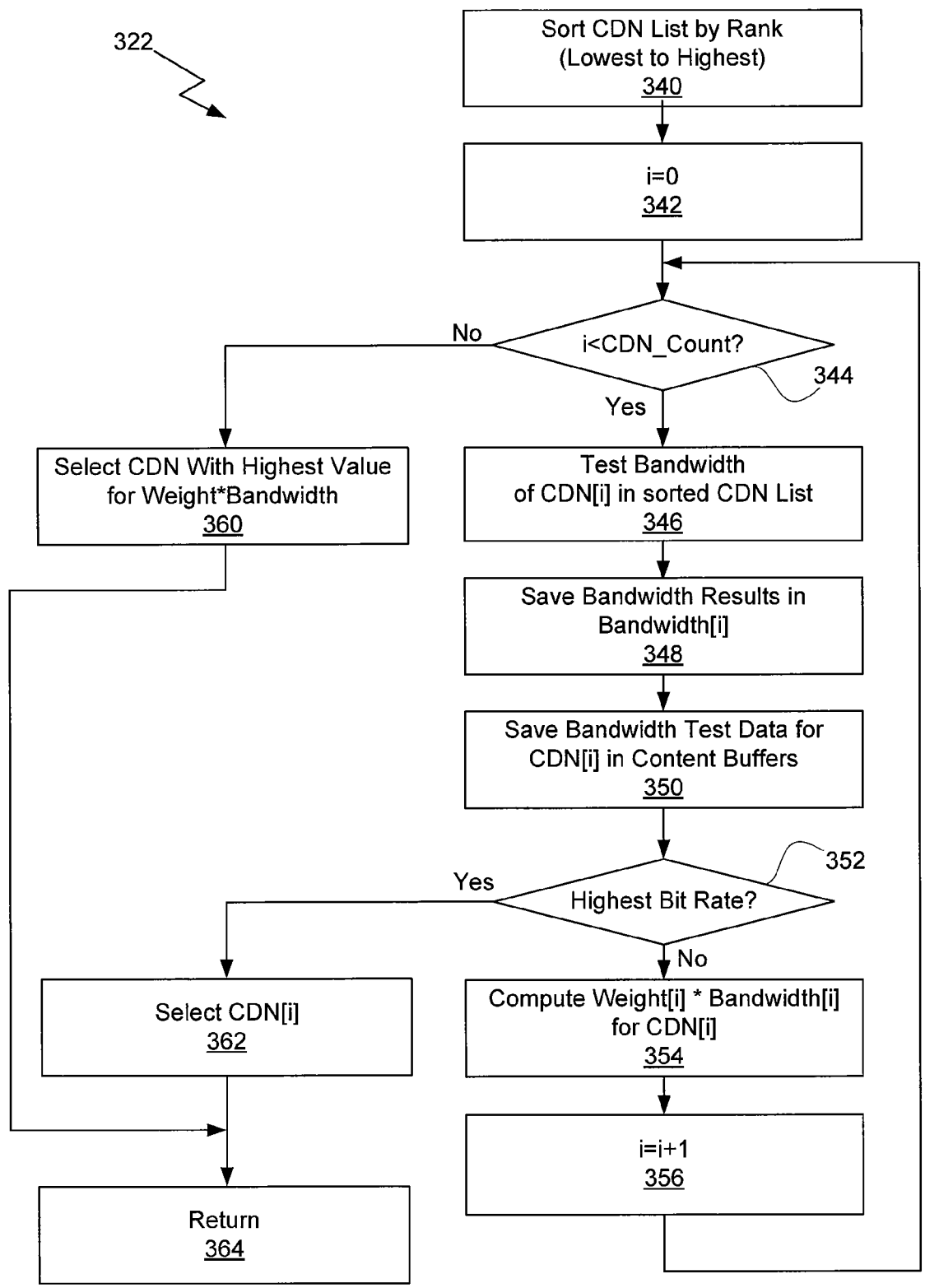
FIG. 3B is a flow diagram of method steps for selecting a content distribution network within a content distribution system from which to download a specific digital content file, according to one embodiment of the invention.
Figure 3C:
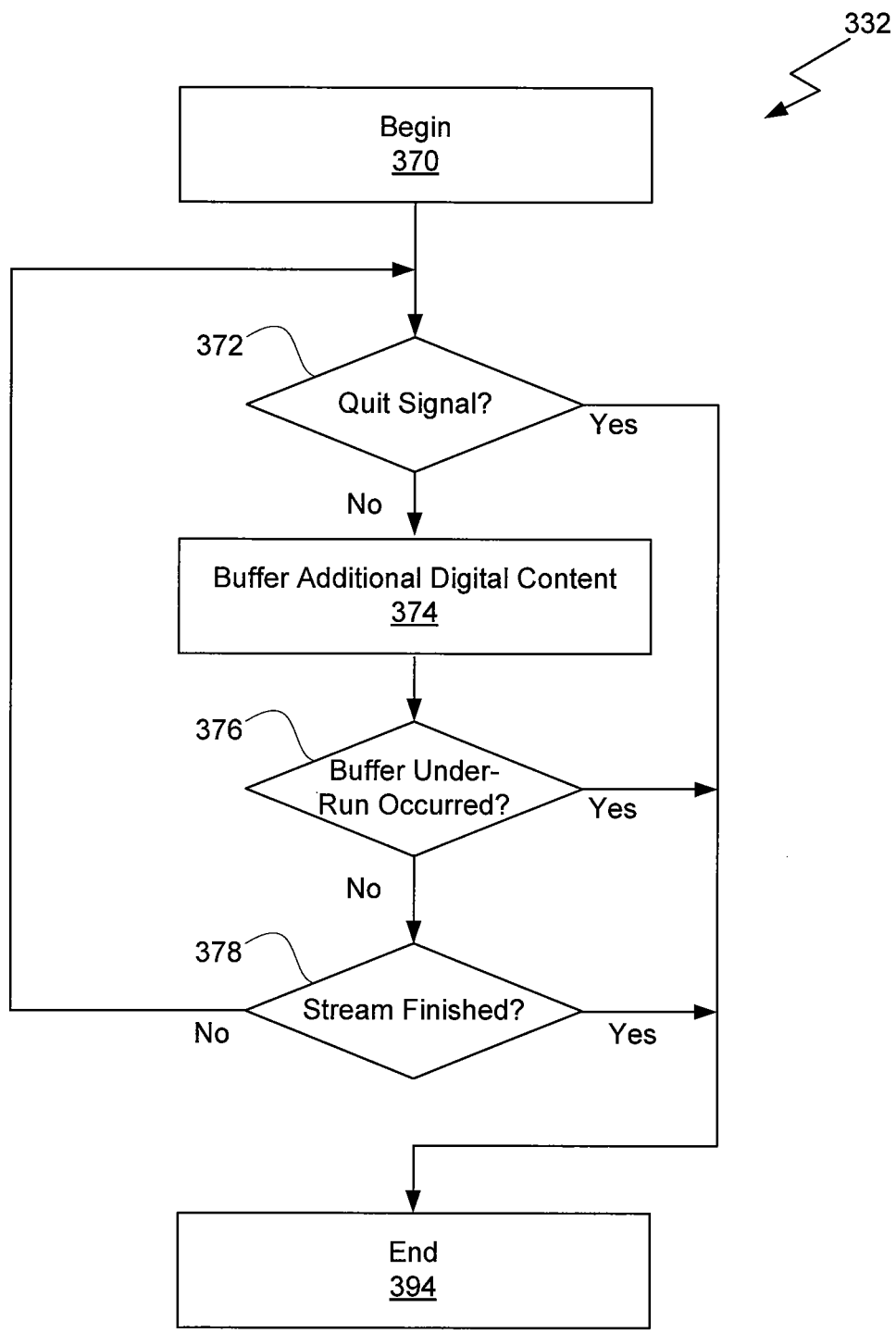
FIG. 3C is a flow diagram of method steps for buffering a digital content file downloaded from a content distribution network, according to one embodiment of the invention.

In step 330, the playback application 236 launches a buffering thread, as described in greater detail in FIG. 3C. The buffering thread is configured to continue downloading additional digital content associated with the selected digital content file from the CDN 140 and buffering that data in the content buffer 245. In step 335, the playback application 236 launches a playback thread. The playback thread is configured to read audio and video data from the content buffer 245 and generate a corresponding audio and video stream for playback to the user.

In step 338, the playback application 236 waits for the playback thread launched in step 335 to terminate. In step 390, the playback application 236 determines whether the selected digital content file has been played to the end based on an exit condition of the playback thread. If, in step 390, the selected digital content file has not been played to the end, then the method 300 returns to step 320, described above. Such a scenario occurs when the playback thread encounters a buffer under-run and needs to be re-started. A time marker may be stored to indicate where the selected digital content file should start playing upon re-start. If, however, in step 390, the selected digital content file has been played to the end, then the method terminates in step 392.

FIG. 3B is a flow diagram of method steps 322 for selecting a CDN 140 within the content distribution system 100 from which to download the selected digital content file, according to one embodiment of the invention. Although the method steps are described in conjunction with the systems of FIGS. 1 and 2, persons skilled in the art will understand that any system configured to perform the method steps, in any order, is within the scope of the invention. In sum, the method steps 322 determine the specific CDN 140 from which the selected digital content file should be downloaded based on download performance requirements specified by the content player 110 as well as the assigned CDN preferences for the content player 110 reflected in the CDN list 240. Again, the method steps 322 describe step 320 of FIG. 3A in greater detail and, in one embodiment, are performed by the content player management thread within the playback application 236.

The method begins in step 340, where the playback application 236 sorts the CDNs 140 included in the CDN list 240 based on the ranks associated with the CDNs 140 to generate a sorted CDN list. Each CDN 140 in the sorted CDN list is assigned a corresponding rank, as illustrated in Table 1. In one embodiment, the first CDN 140 in the sorted CDN list has a rank of one ("1"), and each subsequent CDN in the sorted CDN list has an increasing rank. A variable "CDN_Count" is set to reflect a count of CDNs 140 within the sorted CDN list.

In step 342, the playback application 236 initializes a variable "i" to zero. The variable "i" determines which CDN 140 within the sorted CDN list is currently being evaluated. In step 344, the playback application 236 compares the value of "i" to the total number of CDNs 140 within the sorted CDN list. If the value of "i" is less than CDN_Count, which reflects the total number of CDNs 140 within the sorted CDN list, then the method proceeds to step 346. In step 346, the playback application 236 performs a bandwidth test on CDN[i], i.e., the CDN 140 currently being evaluated. To perform the bandwidth test, a portion of the selected digital content file is downloaded from CDN[i] to the content player 110 to evaluate the amount of bandwidth available between CDN[i] and the content player 110. The available bandwidth in this context includes instantaneous bandwidth between CDN[i] and content player 110 through the communications network 150 and takes overall current load on CDN[i] into consideration as well. When the communications network 150 is congested between CDN[i] and the content player 110, the amount of available bandwidth is typically reduced due to the congestion. Similarly, when CDN[i] is heavily loaded with download requests, the amount of available bandwidth is usually reduced because CDN[i] is not able to service the download requests as quickly.

In step 348, the playback application 236 stores the amount of bandwidth available between CDN[i] and the content player 110, referred to as "bandwidth value," in an array "Bandwidth[i]" residing within the memory subsystem 230. In step 350, the playback application 236 stores the downloaded data, referred to as "bandwidth test data," in the content buffer 245.

In step 352, the playback application 236 determines whether CDN[i] can download data to the content player 110 at the highest bit rate associated with the content player 110. Again, the highest bit rate is the maximum average bit rate supported by the content player 110. If CDN[i] cannot download data at the highest bit rate (meaning that the bandwidth value measured for CDN[i] in step 346 is less than the highest bit rate associated with the content player 110), then the method proceeds to step 354, where the playback application 236 computes a weighted bandwidth value for CDN[i]. The weighted bandwidth value for CDN[i] is equal to the bandwidth measured for CDN[i] in step 346 multiplied by the weight value included in the sorted CDN list associated with CDN[i]. In step 356, the playback application 236 increments variable "i" by one before the method returns to step 344, as described above.

Upon returning to step 344, the playback application 236 again compares the value of "i" to the total number of CDNs 140 within the sorted CDN list. If the value of "i" is not less than CDN_Count, then the bandwidth of each CDN 140 within the sorted CDN list has been tested, and a weighted bandwidth value has been computed for each CDN 140 within the sorted CDN list. The method then proceeds to step 360, where the playback application 236 selects the CDN 140 having the greatest weighted bandwidth value as the CDN 140 from which to download the selected digital content file. If two or more CDNs 140 have weighted bandwidth values equal to the greatest weighted bandwidth value, then the playback application 236 selects the CDN 140 having the lowest relative ranking among those two or more CDNs 140, as set forth in the sorted CDN list, as the CDN 140 from which to download the selected digital content file. The method then terminates in step 364.

Returning now to step 352, if CDN[i] can download data at the highest bit rate (meaning that the bandwidth measured for CDN[i] in step 346 is greater than or equal to the highest bit rate associated with the content player 110), then the method proceeds to step 362, where the playback application 236 selects CDN[i] as the CDN 140 from which to download the selected digital content file. In this scenario, no further testing is necessary because the currently tested CDN 140 satisfies download performance requirements of the content player 110. Again, the method terminates in step 364.

As persons skilled in the art will recognize, in a scenario where at least one CDN 140 can provide a download of a digital content file at the highest supported bit rate, the rank order of the CDNs 140 within the sorted CDN list determines which CDN 140 should provide the digital content file to the content player 110. In a scenario where no CDN 140 within the sorted CDN list can provide a download of the digital content file at the highest supported bit rate, the weighted bandwidth value for each CDN 140 in the sorted CDN list is used to select a CDN 140 from which to download the selected digital content file, as set forth above. In one embodiment, a highest ranking (lowest rank number) CDN 140 is selected when a plurality of CDNs 140 of equal weight by bandwidth product are available.

FIG. 3C is a flow diagram of method steps 332 for buffering a digital content file downloaded from a content distribution network 140, according to one embodiment of the invention. Although the method steps are described in conjunction with the systems of FIGS. 1 and 2, persons skilled in the art will understand that any system configured to perform the method steps, in any order, is within the scope of the invention.

The method begins in step 370, where the buffering thread launched at step 330 of FIG. 3A begins execution. Initialization required for a given thread implementation may be performed in this step. Certain parameters may be passed to the buffering thread, including, without limitation, which CDN 140 was selected in step 320 of FIG. 3A, and a time marker used by the buffering thread to determine a start time for buffering. The time marker is important in a scenario where a new CDN 140 needs to be selected because of a prior buffer under-run.

In step 372, the buffering thread determines whether a quit signal is received. Persons skilled in the art will recognize that a signal comprises an inter-process communication mechanism for transmitting messages between executing threads. In this context, the quit signal is a specific signal sent by the playback thread to the buffering thread requesting that the buffering thread terminate execution. The quit signal is generated by the playback thread when the playback thread encounters a critical problem, such as a buffer under-run. As reflected in FIG. 3A, a buffer under-run condition causes the content player management thread executing within the playback application 236 to select a new CDN 140 from which to download the digital content file. Once a determination is made to select a new CDN 140, the buffering thread attempting to download the digital content file from the old CDN 140 terminates.

If, in step 372, a quit signal is not received, then the method proceeds to step 374, where the buffering thread retrieves and buffers additional digital content associated with the selected digital content file from the CDN 140 selected in step 320 of FIG. 3A. In step 376, the buffering thread determines whether a buffer under-run has occurred in the content buffer 245. A buffer under-run occurs when the buffering thread has failed to add sufficient data to the content buffer 245 to keep up with the playback thread acting to consume data from the content buffer 245 while executing a playback of the digital content file. The buffering thread may fail to add sufficient data for reasons including, without limitation, temporary failures within the communications network 150, failure of the selected CDN 140, overloading of the selected CDN 140. When a buffer under-run occurs in the content buffer 245, real-time content playback by the content player 110 is halted. A new CDN 140 from which to download the selected digital content file may then be selected, as described above.

If, in step 376, a buffer under-run has not occurred, then the method proceeds to step 378. In step 378, the buffering thread determines whether the stream (digital content file) has been completely downloaded from the selected CDN 140. If, in step 378, the stream is not finished downloading from the selected CDN 140, then the method returns to step 372, described above, where additional data is downloaded into the content buffer 245. If, however, in step 378, the stream (digital content file) is finished downloading from the selected CDN 140, then the method terminates in step 394. At this point, the buffering thread has successfully downloaded the digital content file into the content buffer 245

Referring back to step 376, if a buffer under-run has occurred in the content buffer 245, then the method terminates in step 394. Similarly, in step 372, if a quit signal is received, then the method also terminates in step 394.

Figure 3D:
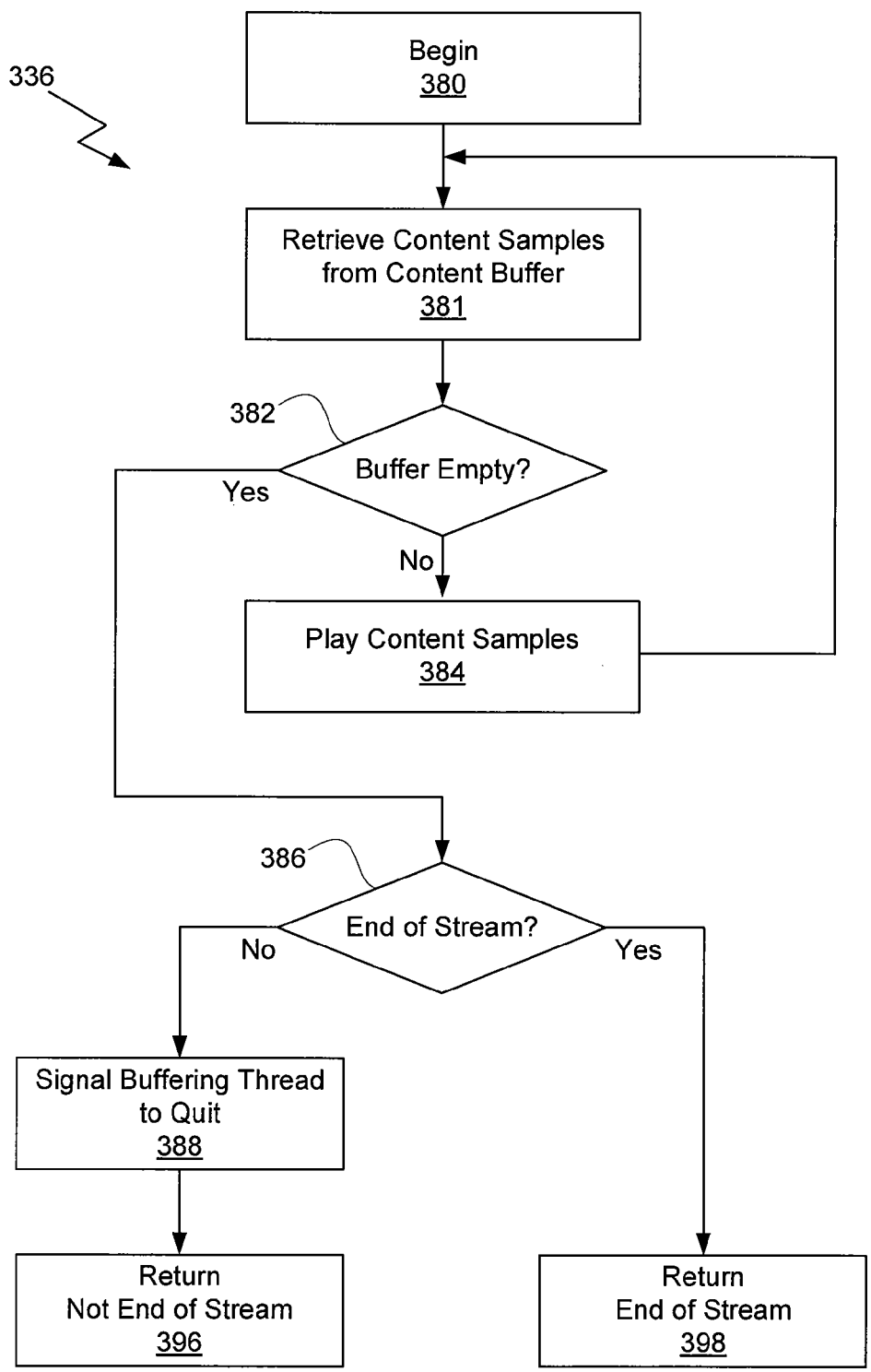
FIG. 3D is a flow diagram of method steps for playing a digital content file buffered in a content buffer within a content player, according to one embodiment of the invention.

FIG. 3D is a flow diagram of method steps 336 for playing digital content buffered in the content buffer 245 within the content player 110, according to one embodiment of the invention. Although the method steps are described in conjunction with the systems of FIGS. 1 and 2, persons skilled in the art will understand that any system configured to perform the method steps, in any order, is within the scope of the invention.

The method begins in step 380, where the playback thread launched in step 335 of FIG. 3A is initialized according to a given thread implementation. Again, certain parameters may be passed to the playback thread, including, without limitation, a time marker. In step 381, the playback thread attempts to retrieve content samples (audio and video stream data) from the content buffer 245. In step 382, the playback thread determines whether the content buffer 245 is empty. If, in step 382, the content buffer 245 is not empty, then the playback thread proceeds to step 384, where the playback thread plays a certain quantity (a certain time span or byte count) of content samples from the content buffer 245. The method then returns to step 381.

If, however, in step 382, the content buffer 245 is empty, then the method proceeds step 386. In step 386, the playback thread determines whether the end of a stream has been encountered and the digital content file has been played to a normal conclusion. If, in step 386, an end of stream has not been encountered, then the method proceeds to step 388, where a quit signal is transmitted to the buffering thread of FIG. 3C. The method then terminates in step 396, where the playback stream returns a not end of stream status to the content player management thread of FIG. 3A. However, if, in step 386, an end of stream has been encountered, then the method terminates in step 398, where the playback stream returns an end of stream status to the content player management thread of FIG. 3A.

One embodiment of the invention may be implemented as a program product stored on at least one computer-readable storage medium residing within the content player 110. In such an embodiment, the content player 110 comprises an embedded computer platform such as a set top box, and the stored program product enables the methods of FIGS. 3A-3D to be implemented by the content player 110. In an alternative embodiment, a program product may be downloaded to a memory within a computer device. For example, the downloaded program product may be executable instructions embedded within an internet web site. In such an embodiment, the content player 110 comprises the computer device, and the downloaded program product enables the methods of FIGS. 3A-3D to be implemented by the content player 110.

In sum, a technique for playing digital content file on a content player 110 is disclosed. The technique involves receiving a list of content distribution networks (CDNs) 140 associated with a requested digital content file, selecting one of the content distribution networks, downloading the digital content file into a content buffer 245, and playing the digital content file from the content buffer 245. The process of selecting a CDN 140 involves sorting a CDN list 240 into a sorted CDN list and testing bandwidth for at least one CDN 140. If a CDN 140 in the sorted CDN list can provide adequate bandwidth for the highest bit rate stream, then the CDN 140 is selected. If a CDN 140 is not found that can provide the highest bit rate stream, then a CDN 140 is selected based on a weight by bandwidth product.

One advantage of the disclosed systems and methods is that each content player 110 within the content distribution system 100 is able to facilitate reliable content playback, despite certain failures within the communications network 150 and certain other CDN 140 failures. The content player 110 is able to re-establish playback under severe fault conditions and beneficially select a good CDN for downloading a digital content file in suboptimal system wide conditions. By contrast, prior art solutions tend to experience catastrophic playback failures when subjected to communications network failure and content server failure. Another advantage is that the present invention enables optimal CDN selection, even when normal operating conditions exist throughout the content distribution system.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for downloading a digital content file from a content distribution network (CDN) residing within a content distribution system, the method comprising:
receiving a CDN list from a content directory server that includes one or more CDNs residing within the content distribution system and also includes a rank and a weight for each of the one or more CDNs;
selecting a CDN from the CDN list from which to download the digital content file based on a bandwidth test, wherein the selected CDN is capable of downloading a portion of the digital content file to a content player machine at a highest bit rate associated with the content player machine or has a weighted bandwidth greater than or equal to the weighted bandwidth associated with any other CDN included in the CDN list, the weighted bandwidth associated with a particular CDN being equal to the product of the bit rate at which the particular CDN can download the portion of the digital content file to the content player machine and the weight included in the CDN list for the particular CDN;
launching a buffering thread configured to download digital content associated with the digital content file from the selected CDN and to store the digital content in a content buffer; and
launching a playback thread configured to play the digital content stored in the content buffer.

2. The method of claim 1, wherein the step of selecting comprises the steps of:
computing, for a first CDN in the CDN list, a first bit rate at which the first CDN can download the portion of the digital content file to the content player machine; and
determining whether the first bit rate is equal to the highest bit rate associated with the content player machine.

3. The method of claim 2, wherein the first bit rate is equal to the highest bit rate associated with the content player machine, and the step of selecting further comprises the step of selecting the first CDN.

4. The method of claim 2, wherein the first bit rate is not equal to the highest bit rate associated with the content player machine, and the step of selecting further comprises the steps of:
computing, for a second CDN in the CDN list, a second bit rate at which the second CDN can download the portion of the digital content file to the content player machine; and
determining whether the second bit rate is equal to the highest bit rate associated with the content player machine.

5. The method of claim 1, wherein no CDN in the CDN list is capable of downloading the portion of the digital content file to the content player machine at the highest bit rate, and the step of selecting comprises the steps of:
for each CDN included in the CDN list, computing a bit rate at which the portion of the digital content file can be downloaded to the content player machine; and
for each CDN included in the CDN list, computing the weighted bandwidth associated with the CDN.

6. The method of claim 5, wherein a first CDN in the CDN list has a weighted bandwidth that is greater than the weighted bandwidth associated with any other CDN included in the CDN list, and the step of selecting further comprises the step of selecting the first CDN.

7. The method of claim 5, wherein two or more CDNs in the CDN list have the same weighted bandwidth, and the step of selecting further comprises the step of selecting a first CDN of the two or more CDNs that has the lowest relative rank set forth in the CDN list.

8. The method of claim 1, wherein the buffering thread is further configured to continue downloading and storing the digital content associated with the digital content file until the buffering thread encounters a quit signal indicating that a buffer under-run condition has occurred or an end-of-stream signal indicating that the entire digital content file has been downloaded and played.

9. The method of claim 8, wherein the playback thread is configured to:
   continue playing the digital content stored in the content buffer until determining that the content buffer is empty; and
   send the quit signal to the buffering thread, if the entire digital content file has not been played, or
   send the end-of-stream signal to a content player management thread, if the entire digital content file has been played.

10. The method of claim 9, wherein the step of selecting a CDN is repeated to select a new CDN from the CDN list, if the playback thread sends the quit signal to the buffering thread.

11. The method of claim 1, wherein the digital content file comprises digital content associated with a movie or a television show.

12. The method of claim 1, wherein a CDN from the CDN is selected based only on the highest bit rate associated with the content player device or only on the weighted bandwidths associated with the CDNs included in the CDN list.

13. A non-transitory computer-readable medium including instructions that, when executed by a processing unit, cause the processing unit to download a digital content file from a content distribution network (CDN) residing within a content distribution system, by performing the steps of:
   receiving a CDN list from a content directory server that includes one or more CDNs residing within the content distribution system and also includes a rank and a weight for each of the one or more CDNs;
   selecting a CDN from the CDN list from which to download the digital content file based on a bandwidth test, wherein the selected CDN is capable of downloading a portion of the digital content file to a content player machine at a highest bit rate associated with the content player machine or has a weighted bandwidth greater than or equal to the weighted bandwidth associated with any other CDN included in the CDN list, the weighted bandwidth associated with a particular CDN being equal to the product of the bit rate at which the particular CDN can download the portion of the digital content file to the content player machine and the weight included in the CDN list for the particular CDN;
   launching a buffering thread configured to download digital content associated with the digital content file from the selected CDN and to store the digital content in a content buffer; and
   launching a playback thread configured to play the digital content stored in the content buffer.

14. The non-transitory computer-readable medium of claim 13, wherein the step of selecting comprises the steps of:
   computing, for a first CDN in the CDN list, a first bit rate at which the first CDN can download the portion of the digital content file to the content player machine; and
   determining whether the first bit rate is equal to the highest bit rate associated with the content player machine.

15. The non-transitory computer-readable medium of claim 14, wherein the first bit rate is equal to the highest bit rate associated with the content player machine, and the step of selecting further comprises the step of selecting the first CDN.

16. The non-transitory computer-readable medium of claim 14, wherein the first bit rate is not equal to the highest bit rate associated with the content player machine, and the step of selecting further comprises the steps of:
   computing, for a second CDN in the CDN list, a second bit rate at which the second CDN can download the portion of the digital content file to the content player machine; and
   determining whether the second bit rate is equal to the highest bit rate associated with the content player machine.

17. The non-transitory computer-readable medium of claim 13, wherein no CDN in the CDN list is capable of downloading the portion of the digital content file to the content player machine at the highest bit rate, and the step of selecting comprises the steps of:
   for each CDN included in the CDN list, computing a bit rate at which the portion of the digital content file can be downloaded to the content player machine; and
   for each CDN included in the CDN list, computing the weighted bandwidth associated with the CDN.

18. The non-transitory computer-readable medium of claim 17, wherein a first CDN in the CDN list has a weighted bandwidth that is greater than the weighted bandwidth associated with any other CDN included in the CDN list, and the step of selecting further comprises the step of selecting the first CDN.

19. The non-transitory computer-readable medium of claim 17, wherein two or more CDNs in the CDN list have the same weighted bandwidth, and the step of selecting further comprises the step of selecting a first CDN of the two or more CDNs that has the lowest relative rank set forth in the CDN list.

20. The non-transitory computer-readable medium of claim 13, wherein the buffering thread is further configured to continue downloading and storing the digital content associated with the digital content file until the buffering thread encounters a quit signal indicating that a buffer under-run condition has occurred or an end-of-stream signal indicating that the entire digital content file has been downloaded and played.

21. The non-transitory computer-readable medium of claim 20, wherein the playback thread is configured to:
   continue playing the digital content stored in the content buffer until determining that the content buffer is empty; and
   send the quit signal to the buffering thread, if the entire digital content file has not been played, or
   send the end-of-stream signal to a content player management thread, if the entire digital content file has been played.

22. The computer-readable medium of claim 13, wherein a CDN from the CDN is selected based only on the highest bit rate associated with the content player device or only on the weighted bandwidths associated with the CDNs included in the CDN list.

23. A content player device configured to download a digital content file from a content distribution network (CDN) residing within a content distribution system, the content player device comprising:
   a memory that includes a content buffer for storing downloaded digital content; and
   a processing unit coupled to the memory and configured to:
      receive a CDN list from a content directory server that includes one or more CDNs residing within the content distribution system and also includes a rank and a weight for each of the one or more CDNs,
      select a CDN from the CDN list from which to download the digital content file based on a bandwidth test, wherein the selected CDN is capable of downloading a portion of the digital content file to the content player device at a highest bit rate associated with the content player device or has a weighted bandwidth greater than or equal to the weighted bandwidth associated with any other CDN included in the CDN list, the weighted bandwidth associated with a particular CDN being equal to the product of the bit rate at which the particular CDN can download the portion of the digital content file to the content player machine and the weight included in the CDN list for the particular CDN, launch a buffering thread configured to download digital content associated with the digital content file from the selected CDN and to store the digital content in the content buffer, and launch a playback thread configured to play the digital content stored in the content buffer on a display device coupled to the content player device.

24. The content player device of claim 23, wherein a CDN from the CDN is selected based only on the highest bit rate associated with the content player device or only on the weighted bandwidths associated with the CDNs included in the CDN list.

* * * * *